United States Patent [19]
Junell et al.

[11] Patent Number: 6,125,124
[45] Date of Patent: Sep. 26, 2000

[54] SYNCHRONIZATION AND SAMPLING FREQUENCY IN AN APPARATUS RECEIVING OFDM MODULATED TRANSMISSIONS

[75] Inventors: Jari Junell, Vantaa; Mika Kasslin; Mikko Kokkonen, both of Helsinki, all of Finland

[73] Assignee: Nokia Technology GmbH, Pforzheim, Germany

[21] Appl. No.: 08/931,531

[22] Filed: Sep. 16, 1997

[30] Foreign Application Priority Data

Sep. 16, 1996 [FI] Finland ................................. 963649

[51] Int. Cl.[7] ....................... H04J 11/00; H04J 1/00
[52] U.S. Cl. ................... 370/503; 370/208; 375/324; 375/364
[58] Field of Search ........................ 370/206, 208, 370/210, 503, 509, 512, 513, 514, 516, 517; 375/203, 344, 340, 342, 354, 362, 363, 364, 355

[56] References Cited

U.S. PATENT DOCUMENTS

| 5,471,464 | 11/1995 | Ikeda ................................... 370/203 |
| 5,602,835 | 2/1997 | Seki et al. ............................ 370/517 |
| 5,802,117 | 9/1998 | Ghosh ................................... 375/344 |
| 5,812,523 | 9/1998 | Isaksson et al. .................... 370/208 |
| 5,818,813 | 10/1998 | Saito et al. .......................... 370/208 |
| 5,828,710 | 10/1998 | Beale .................................... 375/344 |
| 5,848,107 | 12/1998 | Philips .................................. 375/355 |

FOREIGN PATENT DOCUMENTS

| 0608024 | 7/1994 | European Pat. Off. . |
| 9619056 | 6/1996 | WIPO . |
| 9707620 | 2/1997 | WIPO . |
| 9726742 | 7/1997 | WIPO . |

*Primary Examiner*—Chi H. Pham
*Assistant Examiner*—Steven Nguyen
*Attorney, Agent, or Firm*—Ware, Fressola, Van Der Sluys & Adolphson LLP

[57] ABSTRACT

An OFDM receiver determines (12; 27) the pulse response of a radio channel and locates (13; 14) its starting point, end point and the maximum and its value. The difference between the end point and the starting point gives the length of the pulse response. A guard interval time corresponding to the guard interval separating the OFDM symbols is set (17; 18) in the receiver in such a manner that it covers the most significant components of the pulse response. A slow and monotonous temporal shift of the pulse response between measurement rounds indicates an error in the sampling frequency. The error is corrected (23; 31) in such a manner that the pulse response shift is compensated for.

11 Claims, 4 Drawing Sheets

SYNCHRONIZATION AND SAMPLING FREQUENCY IN AN APPARATUS RECEIVING OFDM MODULATED TRANSMISSIONS

BACKGROUND OF THE INVENTION

1. Technical Field

The invention relates in general to the adjustment of reception characteristics in an apparatus receiving radio-frequency transmissions and in particular to the automatic adjustment of timing and sampling frequency in an apparatus that receives OFDM modulated transmission.

2. Discussion of Related Art

Orthogonal frequency division multiplex (OFDM) refers to a modulation method where the transmitting device divides and attaches the transmitted signal to several subcarriers which are located on the frequency axis at regular intervals on a certain frequency band and which are sent simultaneously. Known radio-frequency communication systems that employ OFDM modulation include the DAB (Digital Audio Broadcasting) and DVB (Digital Video Broadcasting) systems. The former is specified in general outline in the ETS 300 401 standard by the European Broadcasting Union (EBU) and the European Telecommunications Standards Institute (ETSI), and the latter is specified in general outline in the prETS 300 800 draft standard by the same organizations. In these systems, a section of a digital signal to be transmitted on a certain subcarrier is encoded into phase and/or amplitude changes with respect to a certain known phase. That time slice of the transmitted signal during which the modulating phase state is constant separately at each subcarrier frequency is called a OFDM symbol, or a symbol in short.

In order for the receiving device to be able to correctly interpret the phase changes on the different subcarriers, the transmitter must include a certain phase reference in the signal. In the DAB system, the transmitted signal is divided into 24-ms or 96-ms frames, depending on the transmission mode, and each frame has a phase reference symbol at the beginning (after the null symbol) which indicates the phase reference simultaneously to all subcarriers. In the DVB system, the phase reference is included in the so-called pilot channels which are found in each symbol at intervals of twelve subcarriers.

Successful OFDM reception requires that the receiver maintains the correct symbol synchronization and sampling frequency. Symbol synchronization means that the receiver knows at which point of time each symbol begins and times the symbol detection correspondingly. Sampling frequency refers here to the frequency at which the A/D converter in the receiver takes samples from the received analog oscillation in order to convert the signal into digital form, whereby the A/D converter and subsequent circuits can interpret to which bits or bit combinations in the digital data flow the signal phase changes refer. In addition, the receiver has to maintain frequency synchronization, i.e. to tune the reception and mixing circuits so that the detected frequency band covers all subcarriers of the OFDM signal at an accuracy which is less than half of the difference between two adjacent subcarriers. Maintaining the symbol synchronization, sampling frequency and frequency synchronization is especially difficult if the transmitter and receiver are moving with respect to each other. The receiver may be located in a car, for example, and as the car moves around in an urban environment, the propagation path of the radio signal changes constantly, resulting in attenuation and reflections. The receiver may also be located in a satellite, and as the satellite moves, the speed difference between the receiver and the satellite changes, being possibly up to several kilometers per second.

A method is known from Finnish Patent Applications No. 962138 "Vastaanottimen tahdistuminen joutotilassa" and No. 962139 "Signaalin haku eräässä satelliittipuhe-linj ärjestelmässä" to produce and maintain symbol synchronization and frequency synchronization in a radio system that does not use OFDM modulation. The method is based on the fact that a received signal includes on a certain control channel a synchronization sequence comprising bits in succession and a frequency information part which contains a short duration of pure sine wave at a desired frequency. The synchronization sequence belongs as part of the rest of the signal to a higher-power burst, and the receiver gets the coarse frame synchronization just by monitoring the highest received power peaks. In the finer synchronization, the receiver calculates how the various timing errors affect the detection of the synchronization sequence and deduces how the timing of the sampling should be corrected to make the received synchronization sequence match better with the known format of the synchronization sequence. Frequency fine-tuning is performed by calculating for a discrete Fourier transform from the received frequency information part and by tuning the reception and mixing frequencies so that the peak of the frequency error spectrum yielded by the Fourier transform is as close to zero as possible. In addition, the receiver monitors how the timing and frequency parameters change and predicts from them the required corrections while in idle state, i.e. receiving only occasionally.

The prior art method described above is not suitable to be used as the synchronization method for an OFDM receiver since an OFDM modulated signal does not include separate synchronization sequences or frequency information parts like the control channel signal of the I-CO Global Communications system described in said patent applications. There exists no efficient prior art method for maintaining the symbol synchronization, sampling frequency and frequency synchronization in an OFDM receiver.

SUMMARY OF INVENTION

An object of the invention is to provide a method and an apparatus for adjusting the symbol synchronization and sampling frequency in an apparatus receiving OFDM modulated transmissions. A particular object of the invention is that the method according to the invention will not require an unreasonably high computing capacity or special components that are difficult to produce, so that the apparatus implementing the method be suitable for large-scale mass production.

The objects of the invention are achieved by using known parts of the received signal to calculate an instantaneous pulse response for the radio channel and by comparing changes in the pulse response with pulse responses calculated earlier and by correcting the synchronization and sampling frequency in order to compensate for the changes in the pulse response.

The method according to the invention is characterized in that it comprises steps wherein a response is determined for the radio channel on which the receiver is receiving the OFDM signal in question, and the guard interval time is set in the reception such that it coincides with the most significant components of the pulse response corresponding to one symbol.

The invention is also directed to a receiver apparatus which is characterized in that it comprises means for determining the instantaneous pulse response for the radio channel, a synchronizable A/D conversion circuit the operation of which includes cyclically repeated guard interval time and information time, and means for driving said A/D conversion circuit to a state in which said guard interval time covers the period of time of the calculated pulse response that includes the most significant components of the pulse response.

The invention is based on the utilization of time-domain correlation characteristics of the reference signal in an OFDM transmission. In the DAB system, the reference signal means a phase reference symbol, and cross-correlation between the received format and the known format of that symbol yields the instantaneous pulse response. In the DVB system, the pulse response is estimated from scattered pilot subcarriers for four consecutive symbols. The required changes in the symbol synchronization and sampling frequency can be deduced by monitoring how the pulse response changes from a measurement to another. The symbol synchronization is preferably set so that the guard interval between the symbols coincides with the beginning of the correlation function representing the pulse response.

A sampling frequency error shows as a slow and monotonously continuous shift of the maximum of the correlation function representing the pulse response. By correcting the sampling frequency the receiver attempts to eliminate said change.

BRIEF DESCRIPTION OF THE DRAWING

The invention is described in more detail with reference to the preferred embodiments, presented by way of example, and to the attached drawing, where.

Determining the radio channel's pulse response in the receiver is a procedure known in the prior art. As far as the invention is concerned, it is in fact irrelevant how the pulse response is determined, but in order to provide sufficient background information for the invention we will below describe one illustrative method for calculating the pulse response. This method for calculating the pulse response is based on the temporal cross-correlation of a certain received signal part and its known format. Temporal cross-correlation of two signals generally refers to the accuracy with which the signals yield the same values at certain moments of comparison. The correlation can be calculated using a known algorithm.

Figure 1:
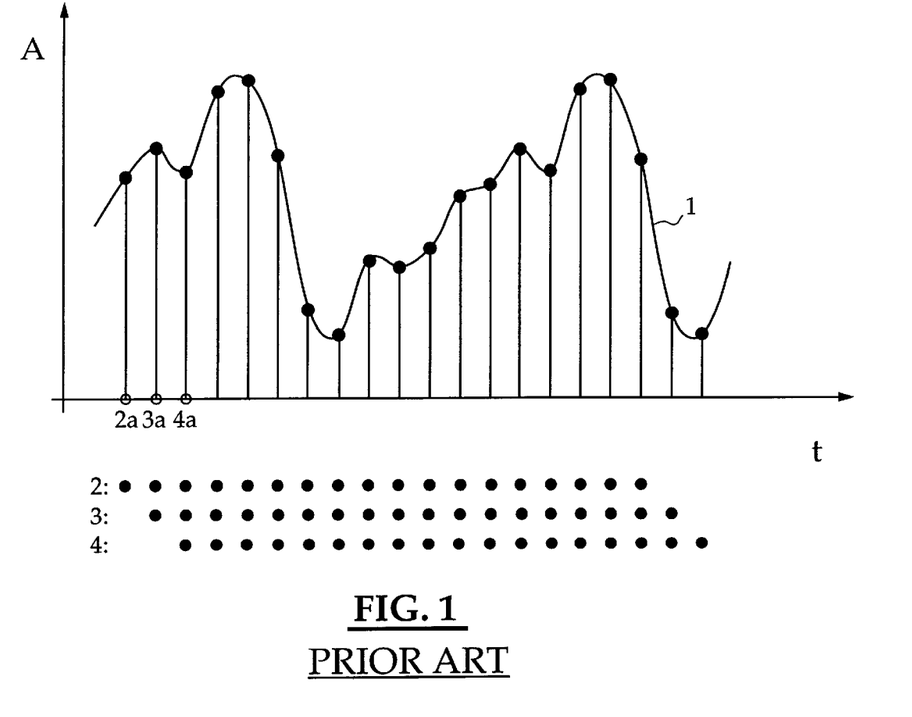
FIG. 1 shows how a certain signal is sampled in a known manner.

FIG. 1 shows how a certain signal is sampled in a known manner for calculating the cross-correlation. The horizontal axis in the figure represents time t and the vertical axis schematically depicts the signal's amplitude A. Curve 1 represents a certain part of the received signal, and the receiver has prior knowledge as to the supposed format of said signal part. An A/D converter in the receiver takes samples of the signal at regular intervals, described by vertical lines in the figure. The first sample sequence 2 comprises the samples that begin from a certain first sampling location 2a and are distributed at regular intervals over a time span which corresponds to the temporal duration of the known signal. As the receiver cannot be sure about the exact beginning of the known signal, it takes a second sample sequence 3, which begins one sample later at location 3a and lasts one sample longer. The figure also shows a third sample sequence 4 which begins at location 4a. There can be as many sample sequences as the receiver is capable of processing with its memory and processing capacity.

Figure 2:
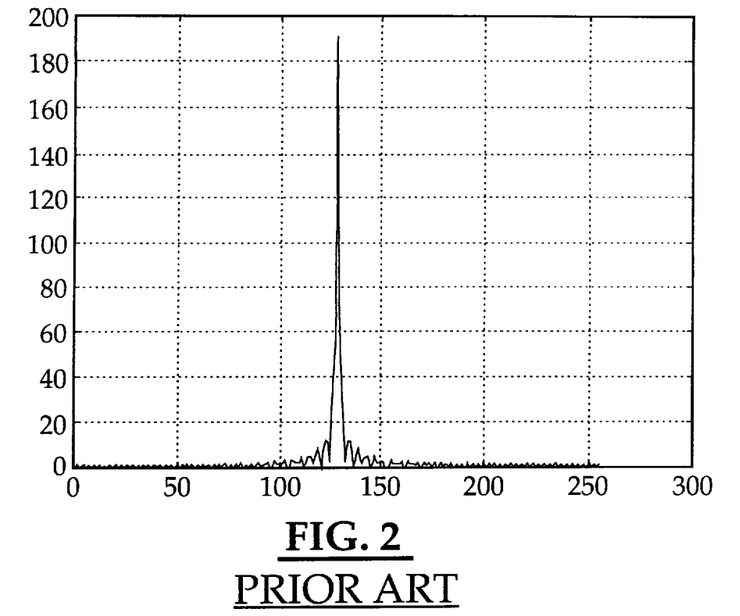
FIG. 2 shows a known absolute value of the auto-correlation function of the phase reference symbol in the DAB system.

The signal format known to the receiver is stored as samples in the receiver's memory. To calculate the cross-correlation the receiver multiplies, sample by sample, the sample sequence stored in the memory by a certain sample sequence obtained by sampling and summing the results. The more accurately the sample sequence corresponds to the known format of the signal, the higher the cross-correlation value. Signal auto-correlation refers to the result produced by the algorithm used for calculating the cross-correlation when the signal is compared to itself FIG. 2 shows the absolute value of the auto-correlation function of the phase reference symbol in the DAB system. Locations on the horizontal axis represent the beginnings of the sample sequences and the vertical axis represents the numerical value of the function. The figure shows that the sampling sequence the number of which is approximately 128 yields by far the highest correlation value, i.e. it has the best correspondence to the correct timing of the sampling.

In practice, it is not sensible to use the direct method described above to calculate cross-correlations that contain dozens of sample sequences to process but instead to use a method wherein the signal is sampled once and a complex Fourier transform is performed on the sequence of samples, thus taking the problem from the time domain to the frequency domain. The receiver gives the complex frequency spectrum produced by the Fourier transform location by location on a reference spectrum which is a complex conjugate of the frequency spectrum of the known format of the signal. By inverse-transforming the obtained result we get directly the curve for the correlation function, which in the case of auto-correlation conforms to FIG. 2.

Figure 3:
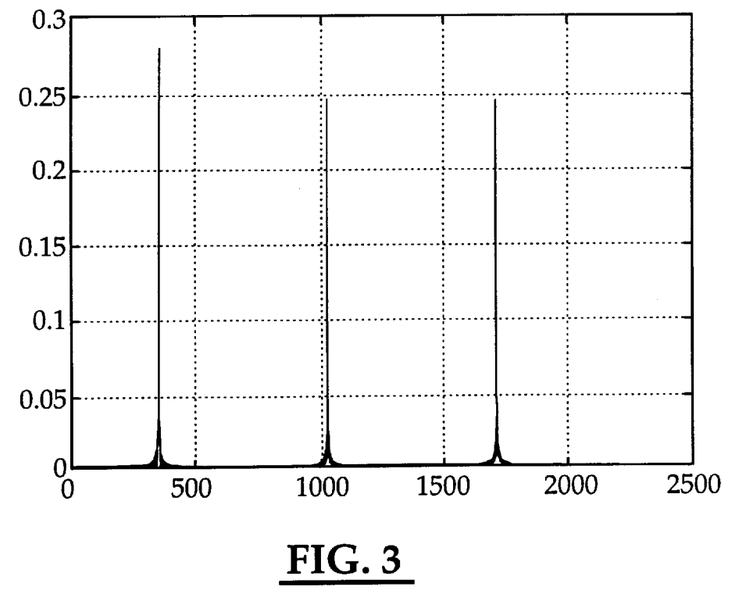
FIG. 3 shows a known absolute value of the auto-correlation function determined from the pilot subcarriers in the DVB system.

FIG. 3 shows the absolute value of an auto-correlation function calculated from four consecutive symbols in the DVB system, wherein the signal part under examination consists of the sum of the pilot channels included in the symbols. The figure shows three successive peaks with a time difference of one-third of an effective symbol (by combining the scattered pilot channels of four symbols we get a symbol for which it is known every third carrier wave). In order for the description below and its algorithms to be similarly applicable both in the DAB and in the DVB systems, we will examine the pulse response curve of the DVB system in such a manner that we only take a certain band around the highest peak, which can be spread on the same horizontal axis scale as the DAB pulse response curve shown in FIG. 2.

Next it will be discussed how changing the radio channel characteristics affects the pulse response curve shown in the manner according to FIGS. 2 and 3. The maximum value of the pulse response curve at the peak location representing the best correlation depends in principle on the signal path attenuation, i.e. the more the signal is attenuated on the way from the transmitter to the receiver, the lower the peak of the curve. In practice, the automatic gain control (AGC) circuit of the receiver evens out the effect of the changing attenuation in the case of an unequivocal peak. If the signal propagates from the transmitter to the receiver via several parallel propagation paths which produce different propagation delays, the curve shows, instead of one peak, several peaks close to each other. Then, their relative heights are significant, because the highest peak corresponds to the propagation path on which the signal is attenuated the least. If the timing used by the receiver is changed, i.e. the beginning of sampling is shifted with respect to the actual contents of the received signal, the peak representing the best correlation moves to the right or to the left on the horizontal axis.

Figure 4A:
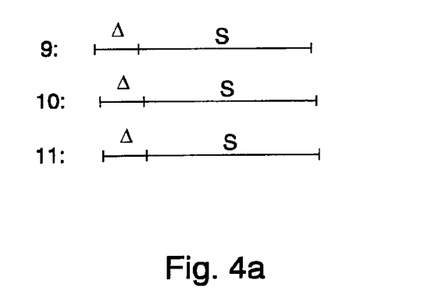
FIGS. 4a and 4b show certain timing situations in the symbol reception.
Figure 4B:
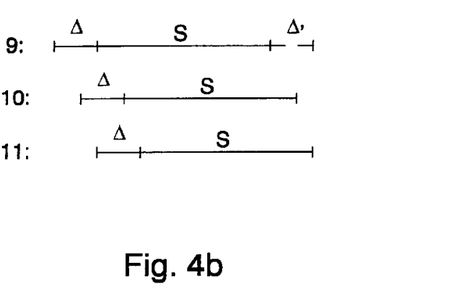

Successive symbols in an OFDM modulated transmission are separated by so-called guard intervals that provide with their contents a characteristic useful from the point of view of the present invention: the interface between a guard interval and the symbol following it does not contain a phase discontinuity at any subcarrier frequency. So, regarding phase information, the contents of a guard interval are the same as those of the symbol following it. FIGS. 4a and 4b show two timing situations, wherein a certain symbol part S containing information and a guard interval A preceding it arrive in a receiver via three different routes, each of which produces a delay unequal to the others. In FIG. 4a, the delays are almost the same, and the symbol echoes propagating via routes 9, 10 and 11 arrive in the receiver almost simultaneously. In FIG. 4b, the differences between the delays are considerably bigger, and so the symbol echoes arriving via different routes arrive at different times. If the calculation method for a radio channel pulse response described above is applied in these timing situations, the pulse response curve produced by FIG. 4a is a single peak, only a little widened, whereas the curve produced by FIG. 4b shows clearly three different peaks due to the fact that cross-correlation yields a relatively good result for each symbol echo arrived at a different time.

The main purpose of the symbol synchronization adjustment algorithm according to the invention is to maintain receiver timing in such a manner that the significant components of the pulse response fall within the period of time defined as the guard interval in the receiver. The foundation of this purpose can be found by examining FIGS. 4a and 4b. The receiver, which according to the invention makes the guard interval to begin from the moment at which the symbol echo that propagated via the fastest propagation path (in FIGS. 4a and 4b, the symbol of propagation path 9) causes a first significant correlation peak, starts to read the information contents proper of the symbol from the location where the information part S of that same (fastest) symbol echo begins. Echoes of the same symbol arriving via other propagation paths (propagation paths 10 and 11) may at that point still contain guard intervals. However, as the phase contents of the guard interval are the same as the phase contents of the symbol part containing information and there are no frequency hops between the guard interval A and the symbol part S, the timing will not cause phase information crosstalk between successive symbols. If the receiver timed its operation in such a way that its notion about the guard interval would coincide with, say, the middlemost received symbol echo (in FIGS. 4a and 4b, the symbol echo arriving via propagation path 10), it would also time the symbol information contents read procedure in such a way that it would coincide with the information part of the middlemost echo. FIG. 4b shows that at the end of this period of time there already arrives via the fastest propagation path a guard interval Δ' which belongs to the next symbol and may have a different phase content, thus resulting in an error in the information part read by the receiver.

Figure 5:
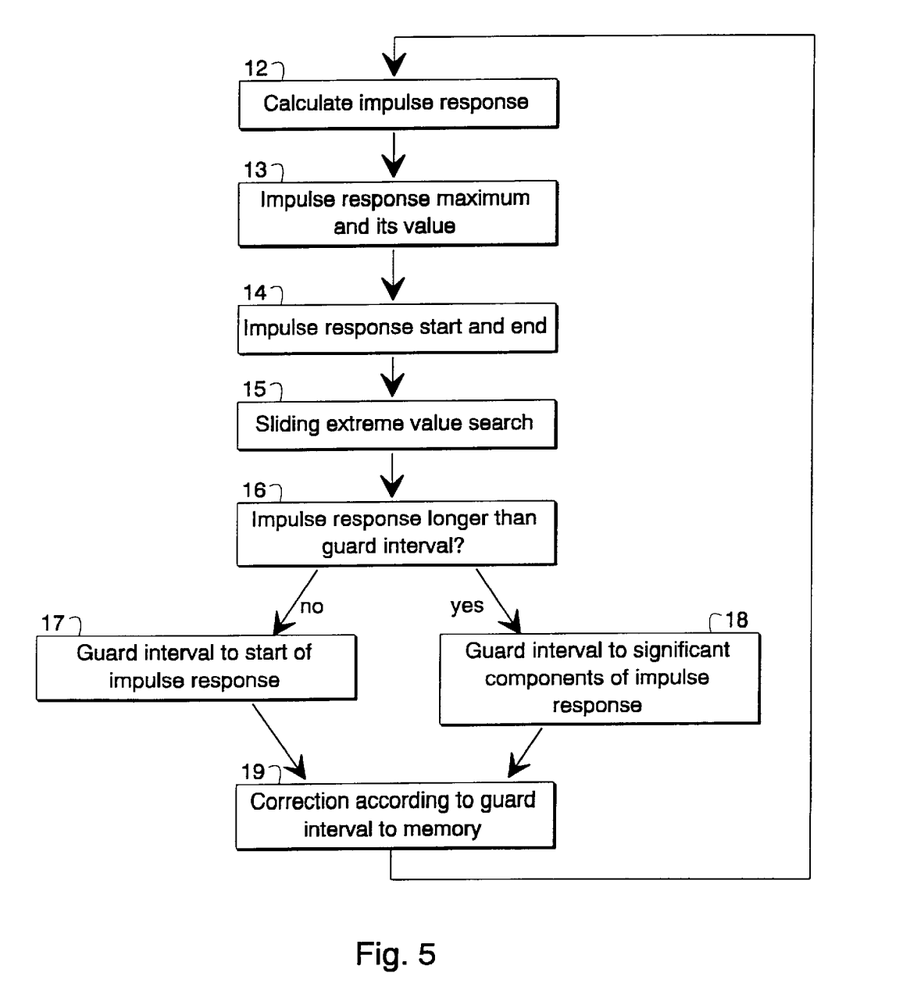
FIG. 5 shows the flow chart of the method according to the invention for correcting the symbol synchronization.

Formulated as a systematic algorithm, the symbol synchrononization method according to the invention is as shown in FIG. 5. In step 12 the receiver calculates the radio channel pulse response using the method described above or a corresponding method. In step 13 it finds the pulse response maximum and stores its location and value in a memory. In step 14 the receiver finds the earliest and the latest significant components of the pulse response by reading the pulse response curve both from the beginning and from the end to the middle. The receiver stores the locations of points in which the value of the pulse response curve is for the first time a certain fraction of the stored maximum, as read both from the beginning and from the end. Said fraction can be, say, 1/8 or other threshold value found suitable by experimentation.

In step 15 the receiver performs a sliding extreme value search for two successive estimation rounds. This means that it compares the latest stored location of the first significant component of the pulse response with the location of the corresponding component stored during the previous estimation round and chooses the earlier of these two locations as the beginning of the pulse response. Similarly, the receiver compares the latest detected end of the pulse response with the end detected in the previous round and chooses the later of these values. At the same time, however, it saves the currently stored pulse response beginning and end for the comparison in the next round. The aim of said sliding extreme value search is to eliminate the effect of sudden disturbances. The receiver calculates the length of the pulse response by subtracting the location of the beginning from the location of the end. It is assumed here that the receiver knows how the scale of the horizontal axis of the graph of the pulse response corresponds to real time.

Step 17 is performed if it is detected in the inference step 16 that the length of the pulse response calculated by the receiver is shorter than the length of the guard interval between OFDM symbols which is known to the receiver. The receiver chooses the beginning of the pulse response determined in the previous step as the beginning of the guard interval to be used in the received symbol interpretation. If the calculation shows that the length of the pulse response is greater than the length of the guard interval, the receiver performs the next step 18, wherein it sets the guard interval for the symbol interpretation such that the sum of the absolute values of the pulse response components left outside the guard interval is as small as possible. Finally, in step 19, the receiver corrects the pulse response beginning and end estimates in its memory so that they correspond to the correction of guard interval location performed in step 17 or 18. The algorithm then returns to its starting point.

To adjust the sampling frequency the method according to the invention includes a classification step, in which the receiver examines how big changes there have occurred in the pulse response timing. Big changes are caused by radical changes in the radio channel, e.g. when new propagation paths appear or old ones are lost.

Small but repeated changes in the same direction are caused by the fact that the sampling frequency of the receiver is not exactly as it should be. If the sampling frequency of the receiver is too high, the receiver will take an amount of samples corresponding to one symbol from a period of time which is shorter than a true symbol. The receiver starts taking samples for the next symbol too early and the pulse response maximum shifts to a later point. Similarly, if the receiver's sampling frequency is too low, it will not have time to take an amount of samples corresponding to one symbol before the next symbol starts and the pulse response maximum shifts to an earlier point.

Figure 6:
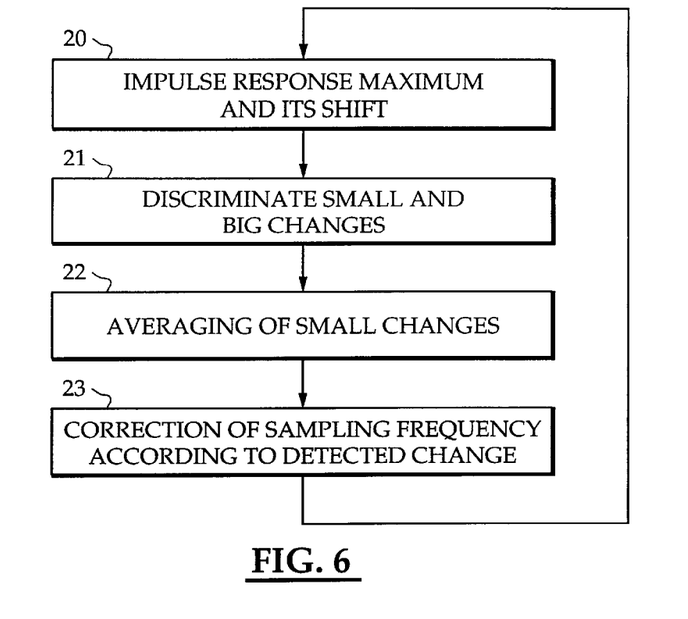
FIG. 6 shows the flow chart of the method according to the invention for correcting the sampling frequency.

FIG. 6 shows a flow chart of the algorithm for that part of the invention which adjusts the sampling frequency. In step 20 the receiver finds the location for the pulse response maximum (or reads it from memory if it was stored in step 13 of FIG. 5) and calculates how much the maximum has moved with respect to the maximum of the previous estimation round. The difference between the maximum locations is stored in memory. In step 21 the receiver sorts nine successive differences according to their magnitude and selects the three middlemost ones. This procedure corresponds in a way to low pass filtering since therein the receiver assumes that the three biggest differences, in absolute values, at both extremes (positive and negative directions) correspond to the aforementioned "big changes", i.e. are caused by other reasons than a sampling frequency error. Here, we have chosen the figures three and nine by experimentation, and the invention does not in fact place any restriction as to how the examination is limited to small enough changes. In step 22 the receiver calculates the average ("ave") of the differences it has selected. The relation of parameter "ave" to the time difference between the moments of estimation for two pulse responses yields a ratio which gives the correction to the sampling interval. Mathematically presented, the correction ΔT to the sampling interval length T is obtained as follows:

$$\Delta T = \frac{ave}{frame\_length} T,$$

where parameter frame_length equals the time difference between the estimation moments of two pulse responses. Its unit must be the same as that of parameter "ave". The parameters are preferably expressed as multiples of the sampling interval. In step 23 of FIG. 6 the receiver calculates the correction to the sampling interval according to the equation above. The new sampling frequency equals the inverse value of the new sampling interval.

The name of parameter frame_length suggests that in a frame-based system, such as the DAB, the pulse response estimation and the sampling frequency correction following it are preferably performed at intervals of one frame because there is at the beginning of each frame a phase reference symbol. In systems like the DVB, where information is not transmitted in frames, the length of parameter frame_length can be freely chosen and it may even change according to the operating mode of the receiver. According to an advantageous embodiment, a DVB receiver checks whether it gets its operating voltage from a fixed electric network or from a portable power source. A fixed electric network means that the receiver is probably unmoving and the characteristics of the radio channel will change only slightly and, therefore, the pulse response estimation is not needed very often. A DVB receiver with a portable power source may be moving and, therefore, the pulse response estimation and the symbol synchronization and sampling frequency corrections following it should be performed more often.

In DVB and other systems based on coherent detection, the symbol synchronization and/or sampling frequency correction has an effect on the channel estimate as well, so the receiver has to take this change into account and compensate for it by adjusting the channel tuning. In systems like the DAB, there is at the beginning of each frame a phase reference after which the detection of the same frame is performed as differential detection. This kind of reception arrangement automatically takes into account the channel estimate correction, as long as the corrections are made at the frame boundary.

Figure 7:
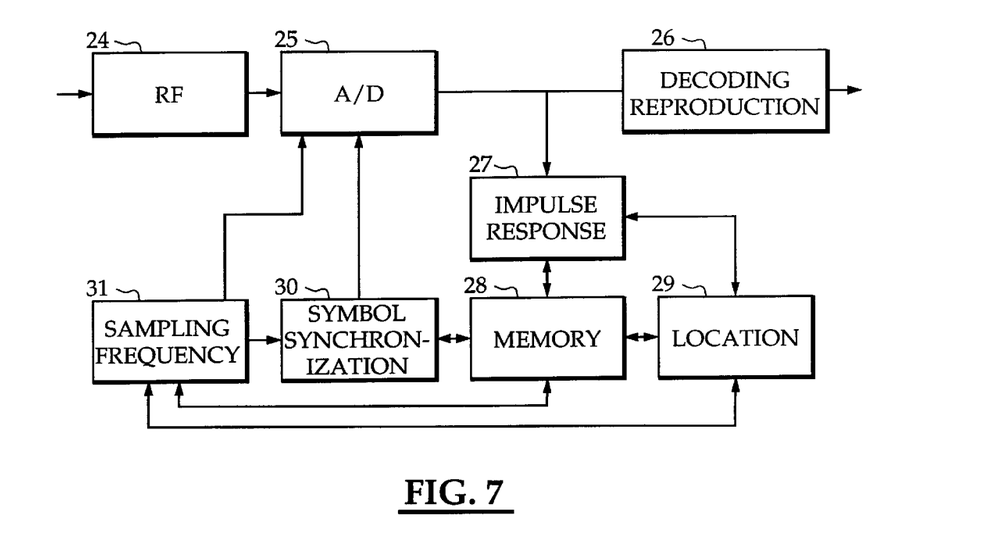
FIG. 7 shows the block diagram of the receiver according to the invention.

FIG. 7 shows schematically a digital OFDM receiver which can be applied to implement the method according to the invention. A radio-frequency part 24 is in accordance with the prior art and comprises signal reception and amplification elements. An A/D converter 25 converts an analog signal to a digital one and feeds it to the decoding and reproduction part 26 in order to decode the digital information and reproduce the program conveyed by it. An pulse response estimation block 27 calculates a Fourier transform for a sequence of samples produced by the A/D converter, multiplies it by a complex conjugate of the Fourier transform of the known signal read from the memory 28 and inverse-transforms the result, thus producing the pulse response curve. A location block 29 finds the maximum and the beginning and the end for the pulse response. A symbol synchronization block 30 estimates the length of the pulse response and informs the A/D converter 25 about the optimum location of the guard interval with respect to the pulse response and corrects the time indexes in the memory indicating the beginning and end of the pulse response so that they correspond to the new location of the guard interval. A sampling frequency adjustment block 31 chooses certain differences indicating the shift of the pulse response as the basis for a sampling frequency correction and sends a correction instruction to the A/D converter 25. All procedures described above are preferably implemented by programming them as instructions to be carried out by a microprocessor in a manner known to a person skilled in the art.

The invention provides a practical and computationally relatively light method for adjusting the symbol synchronization and sampling frequency in an OFDM receiver. The method according to the invention can be implemented using a receiver apparatus based on common components, so it is suitable for mass production at a cost level required for consumer electronics.

What is claimed is:

1. A method for synchronizing a receiver to an orthogonal frequency division multiplex (OFDM) signal transmitted on a radio channel, said OFDM signal comprising successive symbols separated by guard intervals, comprising the steps of:
   determining (12) a pulse response of the radio channel on which the receiver is receiving the transmitted OFDM signal as a received OFDM signal;
   setting (17; 18) a guard interval time to cause the received OFDM signal to coincide with the most significant components of a pulse response corresponding to one symbol;
   examining (14) the guard interval time for determining a length of the pulse response with respect to the length of the guard interval, and
   comparing pulse response beginning and end points obtained from two successive pulse response estimation rounds to each other and choosing an earlier of beginning points obtained from the two successive estimation rounds as a pulse response beginning point, and choosing a later of the end points obtained from the two successive estimation rounds as the pulse response end point.

2. The method of claim 1, wherein said step of setting comprises as mutually exclusive alternatives, steps wherein
if the pulse response is shorter than the guard interval setting (17), the guard interval time to begin at a beginning of the pulse response from a moment where a pulse response value for a first time exceeds a certain first threshold value, and
if the pulse response is longer the guard interval setting (18), the guard interval time to begin with respect to the pulse response so that a sum of absolute values of the pulse response components left outside the guard interval is as small as possible.

3. The method of claim 1, further comprising the step of measuring (20) a temporal shift of the pulse response between pulse measurements and correcting a receiver sampling frequency on a basis of the measured temporal shift.

4. The method of claim 3, further comprising a step of discriminating (21) and eliminating pulse response shifts that have the highest absolute values for correcting the sampling frequency.

5. The method of claim 4, further comprising the steps of storing and arranging a certain first quantity of successive measured pulse response shifts in order of magnitude, and selecting a certain second quantity of shifts from a middle of a resulting sequence for correcting the sampling frequency.

6. The method of claim 7, wherein said first quantity is nine and said second quantity is three.

7. A receiver for receiving a digital orthogonal frequency division multiplex (OFDM) modulated transmission comprising symbols separated by guard intervals on a radio channel having a certain variable pulse response, comprising:
means (27) for determining an instantaneous pulse response of the radio channel;
a synchronizable analog-to-digital (A/D) conversion circuit (25), operation of which includes cyclically repeated guard interval time and information time;
means (27) for examining the guard interval time for determining a length of the pulse response with respect to the length of the guard interval;
means (28,29) for comparing pulse response beginning and end points obtained from two successive pulse response estimation rounds to each other to choose an earlier of beginning points obtained from said two successive estimation rounds as a pulse response beginning point, and to choose a later of the end points obtained from said two successive estimation rounds as the pulse response end point, and
means (30) for driving said A/D conversion circuit to a state in which said guard interval time covers a period in the calculated pulse response which contains the most significant components of the pulse response.

8. The receiver of claim 7, further comprising means (31) for determining a temporal shift of the pulse response occurring between different pulse response determinations.

9. The receiver of claim 8, further comprising means (31) for changing a sampling frequency used by said A/D conversion circuit on the basis of a calculated temporal shift of the pulse response.

10. A method for synchronizing a receiver to an orthogonal frequency division multiplex (OFDM) signal transmitted on a radio channel, said OFDM signal comprising successive symbols separated by guard intervals, comprising the steps of:
determining (12) a pulse response of the radio channel on which the receiver is receiving the transmitted OFDM signal as a received OFDM signal;
setting (17; 18) a guard interval time to cause the received OFDM signal to coincide with the most significant components of a pulse response corresponding to one symbol;
measuring (20) a temporal shift of the pulse response between pulse measurements and correcting a receiver sampling frequency on a basis of the measured temporal shift
discriminating (21) and eliminating pulse response shifts that have the highest absolute values for correcting the sampling frequency;
storing and arranging a certain first quantity of successive measured pulse response shifts in order of magnitude, and
selecting a certain second quantity of shifts from a middle of a resulting sequence for correcting the sampling frequency.

11. The method of claim 10, wherein said first quantity is nine and said second quantity is three.

* * * * *

UNITED STATES PATENT AND TRADEMARK OFFICE
CERTIFICATE OF CORRECTION

PATENT NO : 6,125,124
DATED : September 26, 2000
INVENTOR(S): Junell et al

It is certified that error appears in the above-identified patent and that said Letters Patent are hereby corrected as shown below:

At col. 9, line 26 (claim 6, line 1), please cancel "7" and substitute --5-- therefor.

At col. 10, line 31 (claim 10, line 16), after "shift", please insert --;--.

Signed and Sealed this

Eighth Day of May, 2001

*Attest:*

NICHOLAS P. GODICI

*Attesting Officer*     *Acting Director of the United States Patent and Trademark Office*